US012281768B1

(12) United States Patent
Huang

(10) Patent No.: US 12,281,768 B1
(45) Date of Patent: Apr. 22, 2025

(54) VEHICLE LAMP WITH A LENS ARRAY

(71) Applicant: MIN HSIANG CORPORATION, Tainan (TW)

(72) Inventor: Chung-Chi Huang, Tainan (TW)

(73) Assignee: MIN HSIANG CORPORATION, Tainan (TW)

( * ) Notice: Subject to any disclaimer, the term of this patent is extended or adjusted under 35 U.S.C. 154(b) by 0 days.

(21) Appl. No.: 18/401,036

(22) Filed: Dec. 29, 2023

(51) Int. Cl.

| | |
|---|---|
| ***F21S 41/33*** | (2018.01) |
| ***F21S 41/148*** | (2018.01) |
| ***F21S 41/275*** | (2018.01) |
| *F21W 102/13* | (2018.01) |

(52) U.S. Cl.
CPC ........... *F21S 41/334* (2018.01); *F21S 41/148* (2018.01); *F21S 41/275* (2018.01); *F21W 2102/13* (2018.01)

(58) Field of Classification Search
CPC ...... F21S 41/334; F21S 41/148; F21S 41/275; F21S 41/265; F21S 41/335; F21S 41/336; F21S 43/249; F21S 43/2492; F21S 41/151; F21S 41/153; F21S 43/241; F21W 2102/13; F21V 7/048; F21V 5/007; G02B 19/0028; B60Q 1/34
See application file for complete search history.

(56) References Cited

U.S. PATENT DOCUMENTS

| | | | | |
|---|---|---|---|---|
| 9,134,002 | B2 | 9/2015 | Okada et al. | |
| 9,316,376 | B2 * | 4/2016 | Orisich | F21S 43/26 |
| 2016/0305627 | A1 * | 10/2016 | Myojin | F21S 41/322 |

FOREIGN PATENT DOCUMENTS

| | | | | |
|---|---|---|---|---|
| CN | 116951355 | A * | 10/2023 | |
| DE | 202013101509 | U1 * | 6/2013 | F21S 48/1154 |
| DE | 102006008191 | B4 * | 10/2015 | F21S 48/215 |
| TW | M390890 | U | 10/2010 | |
| TW | I705911 | B | 10/2020 | |
| TW | M633381 | U | 10/2022 | |
| WO | WO-2021241330 | A1 * | 12/2021 | B60Q 1/0041 |

OTHER PUBLICATIONS

SEARCH English translation of CN-116951355-A (Year: 2023).*
SEARCH English translation of DE-102006008191-B4 (Year: 2015).*
SEARCH English translation of WO-2021241330-A1 (Year: 2021).*
SEARCH English translation of DE 202013101509 U1 (Year: 2013).*

* cited by examiner

*Primary Examiner* — Omar Rojas Cadima
(74) *Attorney, Agent, or Firm* — Best & Flanagan LLP

(57) ABSTRACT

A vehicle lamp is mounted on a vehicle body in which a front-rear direction of the vehicle body is a first direction. The vehicle lamp comprises a light emitting unit and an optical unit. The light emitting unit includes at least one light emitting member. The optical unit includes at least one lens having a light incident portion, a reflective portion, and a light output portion. The light incident portion is disposed corresponding to the light emitting member. The light output portion is disposed along a second direction at a slant angle relative to the first direction. The reflective portion includes a plurality of reflective faces arranged in an array. The light emitting member emits light rays which pass through the light incident portion into the lens. The reflective portion reflects the light rays to the light output portion to thereby output the light rays.

16 Claims, 6 Drawing Sheets

VEHICLE LAMP WITH A LENS ARRAY

BACKGROUND OF THE INVENTION

The present invention relates to a vehicle lamp with a lens array and, more particularly, to a vehicle lamp with a plurality of reflective faces arranged in an array.

A conventional headlamp disposed on the front end of a vehicle body generally includes a light emitting device, a reflective board disposed in front of the light emitting device, a light shielding board, and a lens. The front end of the lens includes a protrusion capable of concentrating light. The light rays emitted from the light emitting device can be reflected by the reflective board to the lens. Then, the light rays are projected forward after concentration by the lens, thereby forming a high beam or a low beam in which the shielding board shields a portion of the light rays.

In the above structure, the reflective board, the light shielding board, and the lens must be disposed in front of the light emitting device, such that the headlamp has a larger dimension in the front-rear direction. As a result, the headlamp will occupy a larger depth in the front-rear direction when the headlamp is disposed on the front end of the vehicle.

Furthermore, the lens of a currently available headlamp has a tilt design to cooperate with the slopes of two sides of the front end of the vehicle. However, the protrusion at the front end of the tilted lens is still large and, thus, still occupies a considerable space of the vehicle body in the front-rear direction.

BRIEF SUMMARY OF THE INVENTION

In an aspect, a vehicle lamp is configured to be disposed on a vehicle body in which a front-rear direction of the vehicle body is a first direction. The vehicle lamp comprises a light emitting unit and an optical unit. The light emitting unit includes a circuit board and at least one light emitting member disposed on the circuit board. The optical unit includes at least one lens. The at least one lens includes a light incident portion, a reflective portion, and a light output portion. The light incident portion is disposed corresponding to the at least one light emitting member. The light output portion is disposed along a second direction at a slant angle relative to the first direction. The reflective portion includes a plurality of reflective faces arranged in an array. The at least one light emitting member emits light rays which pass through the light incident portion into the at least one lens. The reflective portion reflects the light rays to the light output portion to thereby output the light rays.

In an example, the light incident portion is substantially contiguous to the reflective portion.

In an example, the light output portion is spaced from the reflective portion by a spacing, and the light output portion is spaced from the light incident portion by another spacing.

In an example, the at least one lens of the optical unit includes a plurality of lenses continuously disposed along the second direction.

In an example, the light output portion includes a plurality of light outgoing faces which extends substantially perpendicular to the first direction, and each of the plurality of light outgoing faces is planar.

In an example, the light output portion includes a plurality of connecting walls extending substantially along the first direction. Said two adjacent light outgoing faces are connected by one of the plurality of connecting walls. The plurality of connecting walls is substantially parallel to each other.

In an example, the light output portion is stepped.

In an example, the light incident portion includes a light incident face protruding toward the at least one light emitting member. The light incident face has a virtual focus with respect to the at least one light emitting member. The at least one light emitting member is located between the light incident face and the virtual focus.

In an example, the light incident face is substantially contiguous to two opposite sides of the at least one lens and the reflective portion.

In an example, the plurality of reflective faces approximately tapers from a central portion of the reflective portion toward a periphery of the reflective portion, such that the central portion of the reflective portion is slightly convex.

In an example, the plurality of reflective faces is substantially arranged along the second direction and perpendicular to the second direction to present a lattice pattern.

In an example, the vehicle lamp is a headlamp, and the reflective portion reflects light rays to provide a high beam, a low beam, or a mixture of the high beam and the low beam.

In another aspect, a vehicle lamp is configured to be disposed on a vehicle body in which a front-rear direction of the vehicle body is a first direction. The vehicle lamp comprises a light emitting unit and an optical unit. The light emitting unit includes a circuit board and at least one light emitting member disposed on the circuit board. The optical unit includes at least one lens. The at least one lens includes a light incident portion, a reflective portion, and a light output portion. The light incident portion is disposed corresponding to the at least one light emitting member. The light incident portion includes a light incident face protruding toward the at least one light emitting member. The light incident face has a virtual focus with respect to the at least one light emitting member. The at least one light emitting member is located between the light incident face and the virtual focus. The reflective portion includes a plurality of reflective faces arranged in an array. The at least one light emitting member emits light rays which pass through the light incident portion into the at least one lens. The reflective portion reflects the light rays to the light output portion to thereby output the light rays.

In an example, the light incident face is substantially contiguous to two opposite sides of the at least one lens and the reflective portion.

In an example, the light output portion is disposed along a second direction at a slant angle relative to the first direction, and the light output portion is stepped.

In an example, the light output portion includes a plurality of light outgoing faces which extends substantially perpendicular to the first direction. The plurality of light outgoing faces is substantially parallel to each other.

In an example, the plurality of reflective faces approximately tapers from a central portion of the reflective portion toward a periphery of the reflective portion, such that the central portion of the reflective portion is slightly convex.

In an example, the light output portion is disposed along a second direction at a slant angle relative to the first direction, and the plurality of reflective faces is substantially arranged along the second direction and perpendicular to the second direction to present a lattice pattern.

In a further aspect, a vehicle lamp is configured to be disposed on a vehicle body in which a front-rear direction of the vehicle body is a first direction. The vehicle lamp comprises a light emitting unit and an optical unit. The light emitting unit includes a circuit board and at least one light emitting member disposed on the circuit board. The optical unit includes at least one lens. The at least one lens includes a light incident portion, a reflective portion, and a light output portion. The light incident portion is disposed corresponding to the at least one light emitting member. The reflective portion includes a plurality of reflective faces arranged in an array. The plurality of reflective faces is substantially arranged along a second direction and perpendicular to the second direction to present a lattice pattern, wherein the second direction is at a slant angle relative to the first direction. The at least one light emitting member emits light rays which pass through the light incident portion into the at least one lens. The reflective portion reflects the light rays to the light output portion to thereby output the light rays.

In an example, the plurality of reflective faces approximately tapers from a central portion of the reflective portion toward a periphery of the reflective portion, such that the central portion of the reflective portion is slightly convex.

The present invention will become clearer in light of the following detailed description of illustrative embodiments of this invention described in connection with the drawings.

DETAILED DESCRIPTION OF THE INVENTION

Figure 1:
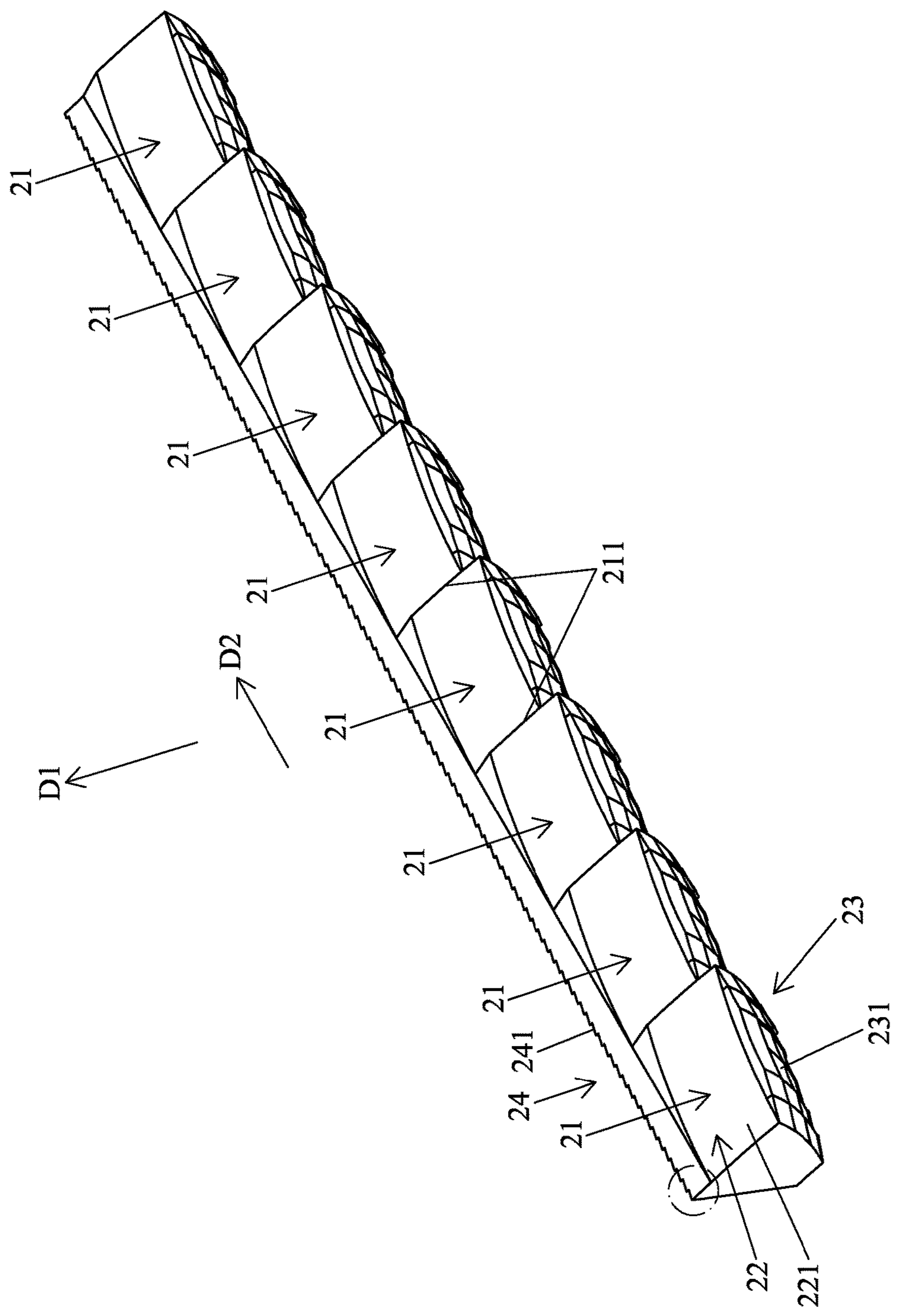
FIG. 1 is a perspective view of an optical unit of a vehicle lamp of an embodiment according to the present invention.
Figure 1A:
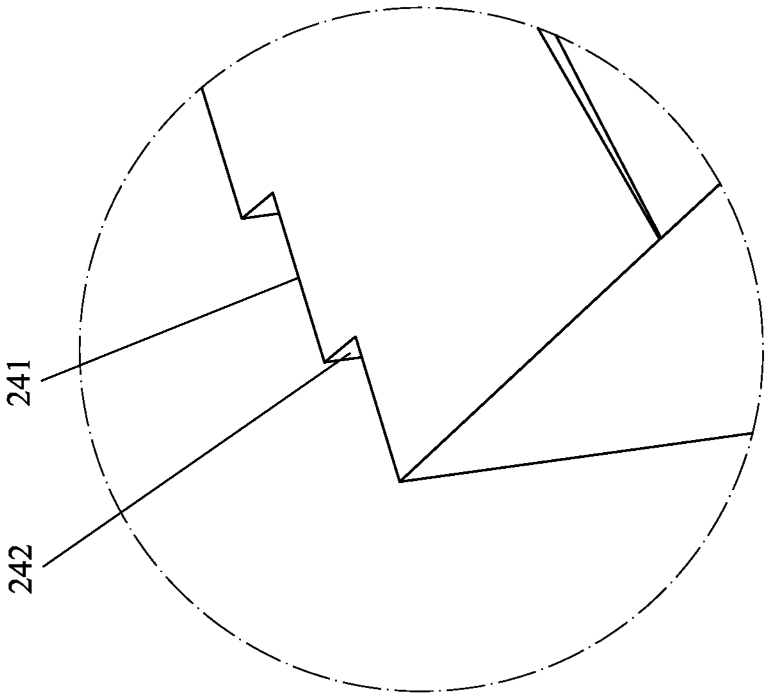
FIG. 1A is an enlarged view of a circled portion of FIG. 1.
Figure 2:
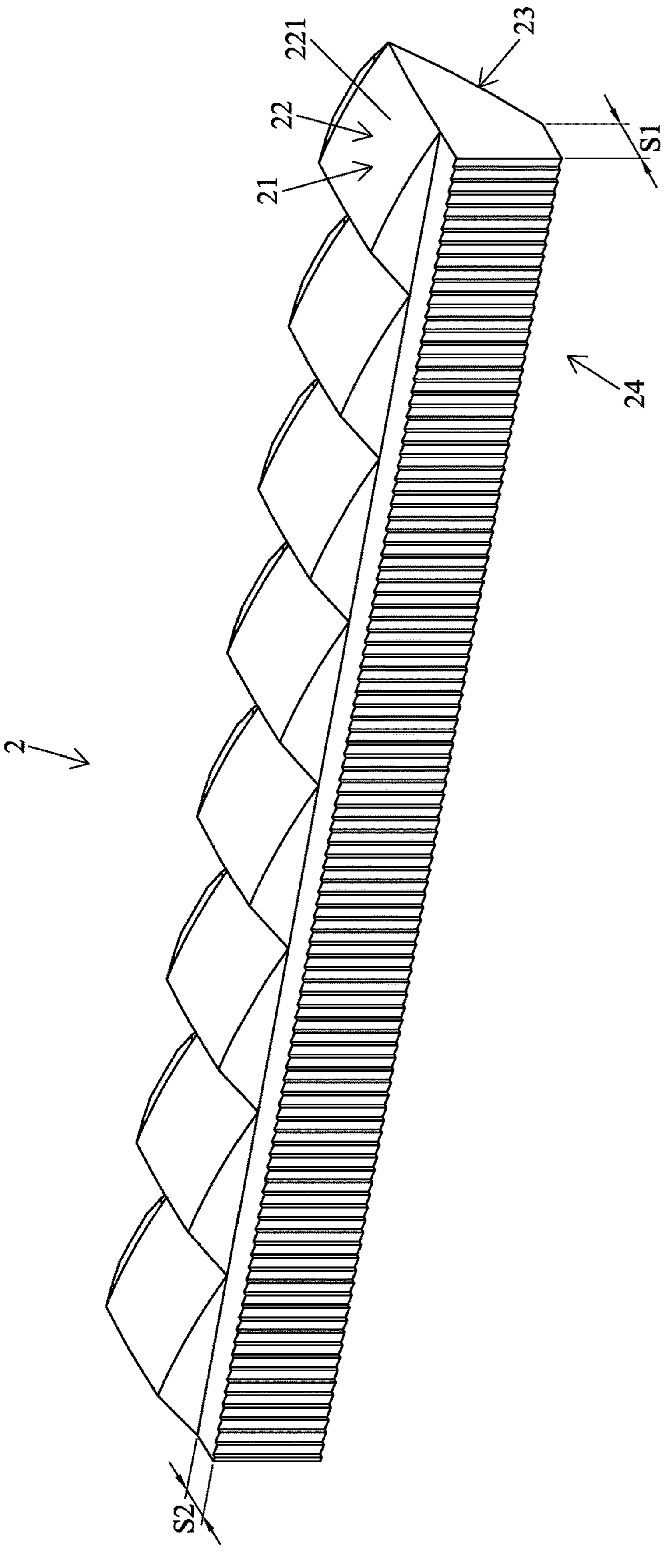
FIG. 2 is another perspective view of the optical unit of the vehicle lamp of the embodiment according to the present invention.
Figure 3:
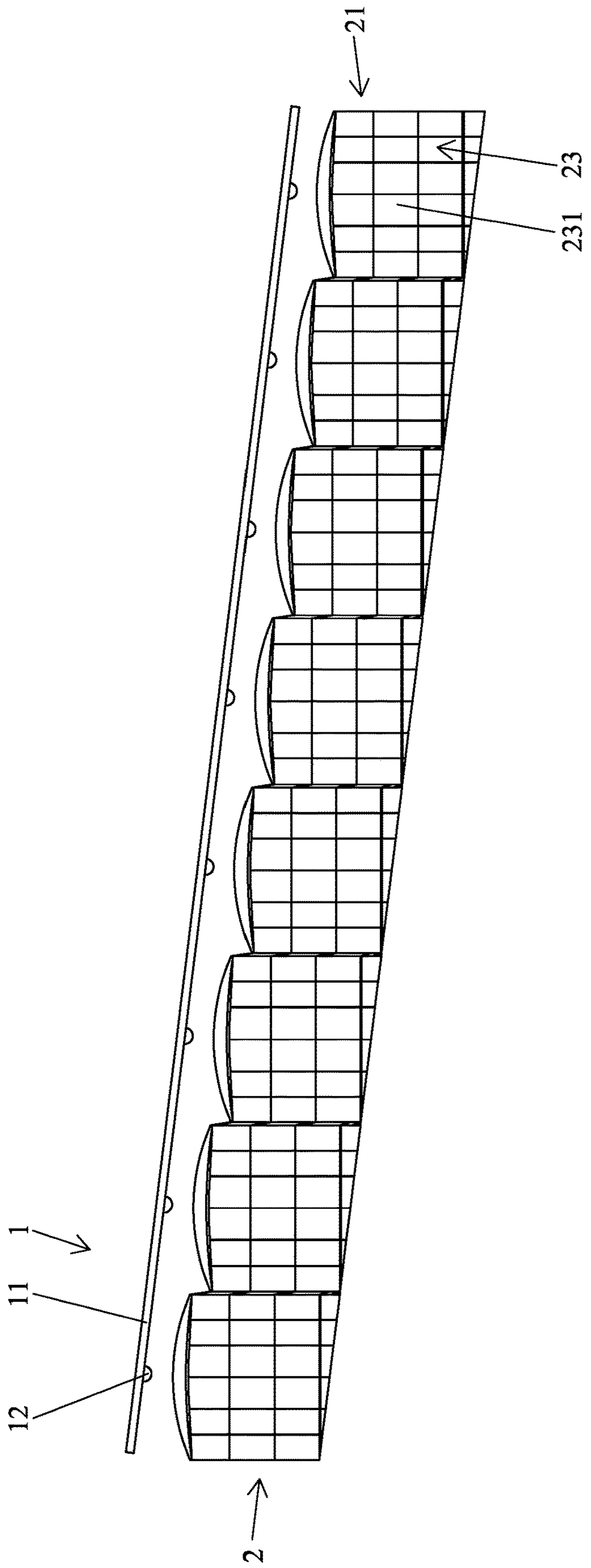
FIG. 3 is a diagrammatic rear view of the vehicle lamp of the embodiment according to the present invention.

Please refer to FIGS. 1-3 showing perspective views and a rear view an optical unit of a vehicle lamp with a lens array according to the present invention. The vehicle lamp according to the present invention is configured to be mounted on a vehicle body (not shown) whose front-rear direction is a first direction D1. The vehicle lamp comprises a light emitting unit 1 and an optical unit 2. The light emitting unit 1 includes a circuit board 11 and a plurality of light emitting members 12 disposed on the circuit board 11. In this embodiment, the vehicle lamp is a headlamp. In other embodiments (not shown), the vehicle lamp may be a turn signal, a front position lamp, a taillight, a fog lamp, etc. Nevertheless, the present invention is not limited in this regard.

The light emitting members 12 are light emitting didoes in this embodiment and are rectilinearly arranged at regular intervals. In other embodiments (not shown), the light emitting members 12 may not be arranged along a straight line or may be arranged at irregular intervals, and light emitting members 12 of other types may be used.

The optical unit 2 includes a plurality of lenses 21 having substantially corresponding structures. The lenses 21 are continuously and rectilinearly disposed along a second direction D2 at a slant angle relative to the first direction D1. Each lens 21 includes a light incident portion 22, a reflective portion 23, and a light output portion 24. In other embodiments, the lenses 21 may not be arranged along a straight line. In this embodiment, the light incident portion 22 is substantially contiguous to the reflective portion 23. In a non-restrictive example, the light output portion 24 is spaced from the reflective portion 23 by a spacing S1, and the light output portion 24 is spaced from the light incident portion 22 by another spacing S2. The light incident portion 22 and the reflective portion 23 are substantially contiguous to each other to reduce the volume of the respective lens 21, thereby miniaturizing the respective lens 21.

The light incident portion 22 is disposed corresponding to the respective light emitting member 12. The light incident portion 22 includes a light incident face 221 protruding toward the respective light emitting member 12. Thus, the light rays emitted from the respective light emitting member 12 can be converged by the light incident portion 22 and then projected into an interior of the respective lens 21. Furthermore, the light incident face 221 has a virtual focus F with respect to the respective light emitting member 12. Each light emitting member 12 is located between the respective light incident face 221 and the respective virtual focus F. Due to the design of the vehicle lamp according to the present invention, the distance between the respective light emitting member 12 and the respective light incident face 221 can be shortened, such that the light emitting member 12 needs not to be located on the virtual focus which is farther to the light incident face 221. Accordingly, the volume of the headlamp can be reduced.

Furthermore, the light incident face 221 of each lens 21 is substantially contiguous to two opposite sides 211 of the lens 21 and the reflective portion 23. Namely, the overall surface of the light incident face 221 is substantially associated with the virtual focus F, such that the light rays emitted from the respective light emitting member 12 can almost completely enter the respective lens 21 via the light incident face 221, thereby increasing the use efficiency of the light ray of the respective light emitting member 12.

The light rays emitted from the respective light emitting member 12 enter the respective lens 21 via the light incident portion 22 and are then reflected by the reflective portion 23 to the light output portion 24 where the light rays are outputted.

The reflective portion 23 includes a plurality of reflective faces 231 arranged in an array. The plurality of reflective faces 231 is substantially arranged along the second direction D2 and perpendicular to the second direction D2 to present a lattice pattern. In other embodiments (not shown), the reflective portion 23 may include 2×2, 3×3, 3×4 or other arrangements, and the reflective faces 231 may have the same surface area or different surface areas and may be planar or curved faces. In this embodiment, the lattice pattern is substantially rectangular. In other embodiments (not shown), the lattice pattern may be substantially square, triangular, rhombic, parallelogrammatic, rectangular, polygonal, irregular, etc., or a combination thereof. Nevertheless, the present invention is not limited in this regard.

Furthermore, in this embodiment, the plurality of reflective faces 231 approximately tapers from a central portion of the reflective portion 23 toward a periphery of the reflective portion 23, such that the central portion of the reflective portion 23 is slightly convex. In other embodiments (not shown), the reflective portion 23 may be substantially a planar surface, a curved surface, or an irregular shape in response to the design of the reflective faces 231. Nevertheless, the present invention is not limited in this regard. Each reflective face 231 can reflect the light rays in the respective lens 21 along a preset reflective angle to thereby transmit through the light output portion 24. The reflective portion 23 can reflect the light rays via the reflective faces 231, such that the reflective portion 23 can accurately reflect the light rays corresponding to a desired light pattern of the headlamp, such as a high beam, a low beam, or a mixture of the high beam and the low beam. Furthermore, the reflective portion 23 of each lens 21 of the optical unit 2 according to the present invention may reflect the light rays at the same reflective angle or different reflective angles.

The light output portion 24 is disposed along the second direction D2 (which is at a slant angle relative to the first direction D1) and is stepped. The light output portion 24 includes a plurality of light outgoing faces 241 which extends substantially perpendicular to the first direction D1. The light outgoing faces 241 are planar and parallel to each other. In other embodiments (not shown), the light outgoing faces 241 may be at a slant angle relative to the first direction D1. Alternatively, the light outgoing faces 241 may be non-planar, such as arcuate or curved faces. Nevertheless, the present invention is not limited in this regard. Furthermore, the light output portion 24 includes a plurality of connecting walls 242 extending substantially along the first direction D1. Said two adjacent light outgoing faces 241 are connected by one of the plurality of connecting walls 242. The connecting walls 242 are substantially parallel to each other.

Both the lenses 21 and the light output portion 24 according to the present invention are disposed along the second direction D2 which is at a slant angle relative to the first direction D1, such that the vehicle lamp according to the present invention may cooperate with the slopes of two sides of the front end of the vehicle body, unlike the conventional lens presenting an obvious protrusive shape. Therefore, the volume of the forwardly protruding portion of each lens 21 and the volume of the portion of the vehicle lamp protruding toward the front end of the vehicle body can be reduced. This provides a volume reducing effect and provides a visual effect of the outline better than the protrusive outline of the conventional vehicle lamp or conventional lens.

Figure 4:
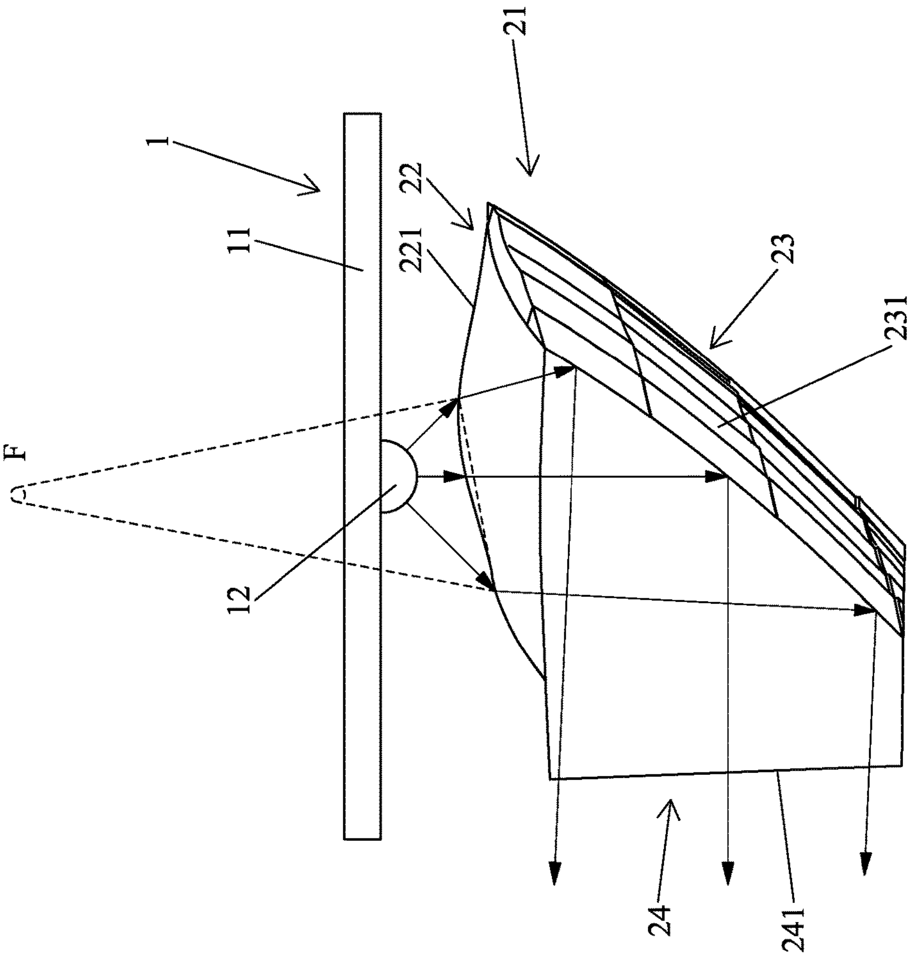
FIG. 4 is a diagrammatic view illustrating emission of light rays from the vehicle lamp according to the present invention.
Figure 5:
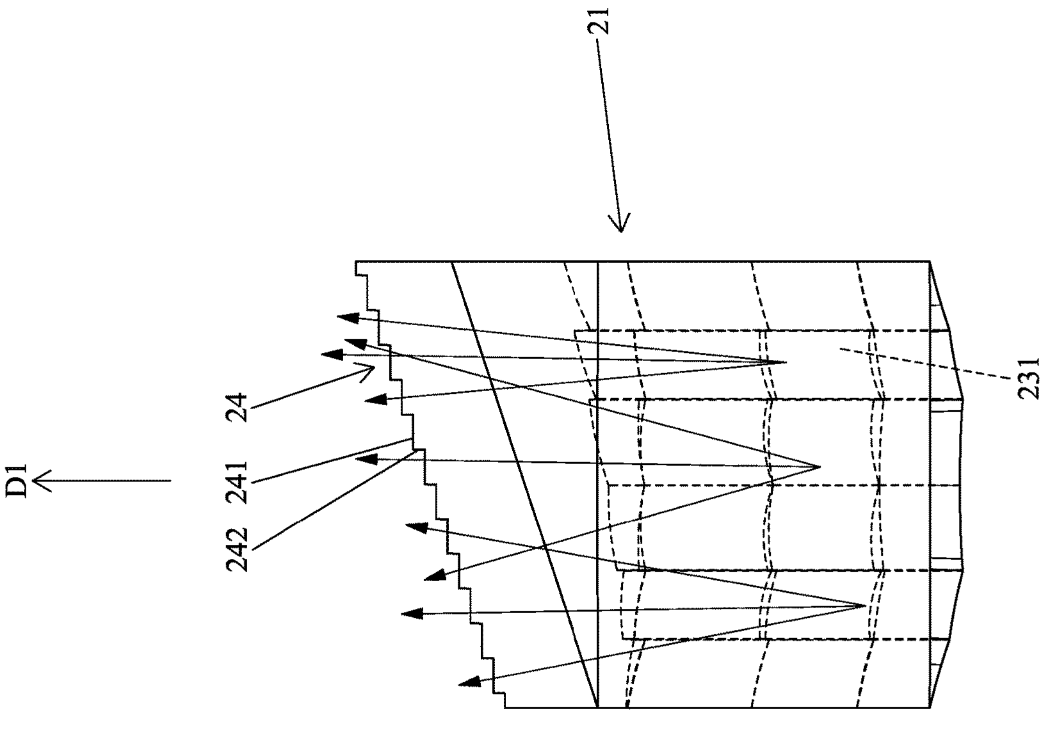
FIG. 5 is a diagrammatic view illustrating the light rays passing through each lens of the vehicle lamp according to the present invention.

Please refer to FIGS. 4 and 5 illustrating emission and paths of light rays from the vehicle lamp according to the present invention. When each light emitting member 12 of the light emitting unit 1 according to the present invention emits light, the light rays can be projected to the light incident portion 22 of the respective lens 21 and can be converged by the light incident face 221 and then incident to the reflective portion 23 of the lens 21. The light rays are then reflected by the reflective faces 231 of the reflective portion 23 to the light output portion 24 according to the preset reflective angle. Thus, all the lenses 21 of the optical unit 2 according to the present invention may output a light pattern, such as a high beam or a low beam. Alternatively, a portion of the lenses 21 of the optical unit 2 may output a high beam, and another portion of the lenses 21 of the optical unit 2 may output a low beam. Furthermore, a single lens 21 may output a mixture of a high beam and a low beam.

Furthermore, the reflective portion 23 of the respective lens 21 according to the present invention can reflect the light rays to the light output portion 24, and the light rays are projected outward via the light outgoing faces 241 of the light output portion 24. The light outgoing faces 241 according to the present invention are disposed substantially perpendicular to the first direction D1. Thus, deviation of the light rays or deformation of the light pattern outputted from the light outgoing faces 241 are prevented, which also assists in accurate output of the light pattern. Furthermore, the connecting walls 242 according to the present invention are substantially disposed along the first direction D1, which is the same as the output direction of the light. Accordingly, adverse influence or blockage of light by the connecting walls 242 can be reduced, thereby assisting in increasing the light output effect.

In view of the foregoing, the vehicle lamp according to the present invention can have a reduced volume and can more accurately output desired light patterns.

Although specific embodiments have been illustrated and described, numerous modifications and variations are still possible without departing from the scope of the invention. The scope of the invention is limited by the accompanying claims.

The invention claimed is:

1. A vehicle lamp configured to be disposed on a vehicle body, with a front-rear direction of the vehicle body being a first direction, the vehicle lamp comprising:

a light emitting unit including a circuit board and at least one light emitting member disposed on the circuit board; and an optical unit including at least one lens, wherein the at least one lens includes a light incident portion, a reflective portion, and a light output portion, wherein the light incident portion is disposed corresponding to the at least one light emitting member, wherein the light output portion is disposed along a second direction at a slant angle relative to the first direction, wherein the light incident portion includes a light incident face that is substantially contiguous to the reflective portion, wherein the at least one light emitting member emits light rays which pass through the light incident portion into the at least one lens, and wherein the reflective portion reflects the light rays to the light output portion to thereby output the light rays, wherein the optical unit includes a plurality of lenses continuously disposed along the second direction, wherein the light output portion is stepped.

2. The vehicle lamp as claimed in claim 1, wherein the light output portion is spaced from the reflective portion by a spacing, and wherein the light output portion is spaced from the light incident portion by another spacing.

3. The vehicle lamp as claimed in claim 1, wherein the light output portion includes a plurality of light outgoing faces which extends substantially perpendicular to the first direction, and wherein each of the plurality of light outgoing faces is planar.

4. The vehicle lamp as claimed in claim 3, wherein the light output portion includes a plurality of connecting walls extending substantially along the first direction, wherein said two adjacent light outgoing faces are connected by one of the plurality of connecting walls, and wherein the plurality of connecting walls is substantially parallel to each other.

5. The vehicle lamp as claimed in claim 1, wherein the light incident portion includes a light incident face protruding toward the at least one light emitting member, wherein the light incident face has a virtual focus with respect to the at least one light emitting member, and wherein the at least one light emitting member is located between the light incident face and the virtual focus.

6. The vehicle lamp as claimed in claim 5, wherein the light incident face is substantially contiguous to two opposite sides of the at least one lens and the reflective portion.

7. The vehicle lamp as claimed in claim 1, wherein a plurality of reflective faces approximately tapers from a central portion of the reflective portion toward a periphery of the reflective portion, such that the central portion of the reflective portion is slightly convex.

8. The vehicle lamp as claimed in claim 1, wherein a plurality of reflective faces is substantially arranged along the second direction and perpendicular to the second direction to present a lattice pattern.

9. The vehicle lamp as claimed in claim 1, wherein the vehicle lamp is a headlamp, and wherein the reflective portion reflects light rays to provide a high beam, a low beam, or a mixture of the high beam and the low beam.

10. A vehicle lamp configured to be disposed on a vehicle body, with a front-rear direction of the vehicle body being a first direction, the vehicle lamp comprising:

a light emitting unit including a circuit board and at least one light emitting member disposed on the circuit board; and an optical unit including at least one lens, wherein the at least one lens includes a light incident portion, a reflective portion, and a light output portion, wherein the light incident portion is disposed corresponding to the at least one light emitting member, wherein the light incident portion includes a light incident face protruding toward the at least one light emitting member, wherein the light incident face has a virtual focus with respect to the at least one light emitting member, wherein the at least one light emitting member is located between the light incident face and the virtual focus, wherein the light incident face is substantially contiguous to two opposite sides of the at least one lens and the reflective portion, and wherein the overall surface of the light incident face is substantially associated with the virtual focus, wherein the at least one light emitting member emits light rays which pass through the light incident portion into the at least one lens, and wherein the reflective portion reflects the light rays to the light output portion to thereby output the light rays.

11. The vehicle lamp as claimed in claim 10, wherein the light output portion is disposed along a second direction at a slant angle relative to the first direction, and wherein the light output portion is stepped.

12. The vehicle lamp as claimed in claim 10, wherein the light output portion includes a plurality of light outgoing faces which extends substantially perpendicular to the first direction, and wherein the plurality of light outgoing faces is substantially parallel to each other.

13. The vehicle lamp as claimed in claim 10, wherein a plurality of reflective faces approximately tapers from a central portion of the reflective portion toward a periphery of the reflective portion, such that the central portion of the reflective portion is slightly convex.

14. The vehicle lamp as claimed in claim 10, wherein the light output portion is disposed along a second direction at a slant angle relative to the first direction, and wherein a plurality of reflective faces is substantially arranged along the second direction and perpendicular to the second direction to present a lattice pattern.

15. A vehicle lamp configured to be disposed on a vehicle body, with a front-rear direction of the vehicle body being a first direction, the vehicle lamp comprising:

a light emitting unit including a circuit board and at least one light emitting member disposed on the circuit board; and an optical unit including at least one lens, wherein the at least one lens includes a light incident portion, a reflective portion, and a light output portion, wherein the light incident portion is disposed corresponding to the at least one light emitting member, wherein the reflective portion includes a plurality of reflective faces arranged in an array, wherein the plurality of reflective faces is substantially arranged along a second direction and perpendicular to the second direction to present a lattice pattern, wherein the second direction is at a slant angle relative to the first direction, wherein the at least one light emitting member emits light rays which pass through the light incident portion into the at least one lens, and wherein the reflective portion reflects the light rays to the light output portion to thereby output the light rays.

16. The vehicle lamp as claimed in claim 15, wherein the plurality of reflective faces approximately tapers from a central portion of the reflective portion toward a periphery of the reflective portion, such that the central portion of the reflective portion is slightly convex.

* * * * *